(12) United States Patent
Woudenberg et al.

(10) Patent No.: US 6,376,639 B1
(45) Date of Patent: Apr. 23, 2002

(54) POLYMERS COMPRISING A FLUORINATED CARBONATE MOIETY

(75) Inventors: Richard Herman Woudenberg, Elst; Tjerk Oedse Boonstra, Duiven, both of (NL)

(73) Assignee: JDS Uniphase Photonics C.V., Arnhem (NL)

( * ) Notice: Subject to any disclaimer, the term of this patent is extended or adjusted under 35 U.S.C. 154(b) by 0 days.

(21) Appl. No.: 09/379,924

(22) Filed: Aug. 24, 1999

Related U.S. Application Data

(63) Continuation of application No. PCT/EP98/00717, filed on Feb. 4, 1998.
(60) Provisional application No. 60/041,622, on Mar. 27, 1997.

(51) Int. Cl.[7] .............................. C08G 64/00
(52) U.S. Cl. ...................... 528/196; 528/198
(58) Field of Search ......................... 528/196

(56) References Cited

FOREIGN PATENT DOCUMENTS

| EP | 0279462 | * | 8/1988 |
| WO | WO 9628493 | * | 1/1997 |

* cited by examiner

*Primary Examiner*—Terressa M. Boykin
(74) *Attorney, Agent, or Firm*—Lacasse & Associates; Randy W. Lacasse; Kevin E. Greene

(57) ABSTRACT

The invention pertains to a cross-linkable fluorinated polymer comprising the carbonate moiety having formula (I) wherein n=1–10 and m=0–9. Preferably, the polymer further comprises a cross-linkable moiety derived from a diol selected from (II) and (III) wherein A, $A_1$, and $A_2$ are independently a bond or $C_{1-12}$ alkylene, or together with the carbon atoms to which they are bonded form a 5- or 6-membered ring; B is independently O or $C_{1-4}$ alkyl; Q is —CO—C(=E)D, wherein D is H or $C_{1-4}$ alkyl, and E is $C_{1-6}$ alkylidene; and each of the alkyl, alkylene, and alkylidene groups may be halogenated. The polymers of the invention can be used in cladding layers or waveguides, in particular for thermo-optical devices.

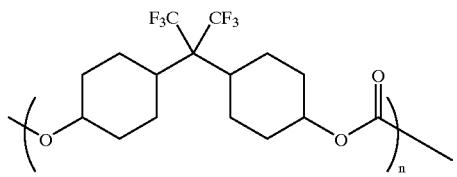

(I)

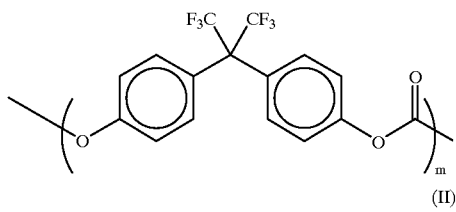

(II)

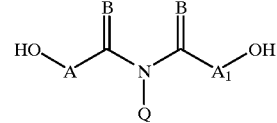

(III)

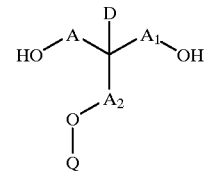

28 Claims, No Drawings

POLYMERS COMPRISING A FLUORINATED CARBONATE MOIETY

This application is a continuation of the PCT/EP98/00717 which this application claims priority to provisional application 60/041,622 filed Mar. 27, 1997.

The present invention is in the field of optical components, more particularly, polymeric optical components. By optical components are meant here, thermo-optical components, electro-optical components or passive components.

Both thermo-optical and electro-optical components are known. The working of thermo-optical components is based on the phenomenon of the optical waveguide material employed exhibiting a temperature dependent refractive index.

Polymeric thermo-optical components generally comprise a polymeric three-layer structure on a substrate. The three-layer structure comprises a low refractive index lower cladding layer, a high refractive index core layer, and a low refractive index upper cladding layer. On top of the upper cladding layer heating elements are provided (usually metal strips) to heat the polymeric cladding and core material, in order to change the refractive index for switching. The working of electro-optical devices is based on the phenomenon of the non-linear optically active material employed exhibiting an electric field dependent refractive index. Polymeric electro-optical components in general also comprise a polymeric three-layer structure. The three-layer structure comprises a low refractive index lower cladding layer, a non-linear optically active, high refractive index core layer, and a low refractive index upper cladding layer. On top of the upper cladding layer electrodes are provided to apply an electric field to the non-linear optically active material to change the refractive index for switching.

Optical components having an at least penta-layered polymer structure on a substrate comprising:
a) a low refractive index lower cladding layer,
b) a core-matching refractive index lower cladding layer,
c) a core layer,
d) a core-matching refractive index upper cladding layer, and
e) a low refractive index upper cladding layer, are also known in the art.

With this specific layer structure optimum transversal confinement can be obtained, which results in less loss of light and an improved switching efficiency.

For optical components preferably silicon substrates are used. These substrates are readily available on the market and are of homogeneous thickness. Furthermore, they are frequently used in integrated circuit techniques and apparatus. One disadvantage of silicon is its high refractive index. Due to this high refractive index the light of the propagating mode might leak into the silicon substrate. The low refractive index lower cladding layer a) is applied to prevent leaking of light from the propagating mode into the silicon substrate. When other substrates are used, the low refractive index lower cladding a) is also of advantage in controlling the confinement of the propagating mode. Using a low refractive index lower cladding a) of appropriate index and thickness gives ample freedom in designing the core-matching refractive index cladding layers b) and d) and the core layer c).

As described above, the optical components usually comprise metal electrodes on top of the upper cladding layer, either for use as heating elements or for applying an electric field. These electrodes are usually made of gold and/or other metals such as chromium, nickel, copper, platinum, or combinations or alloys thereof.

The low refractive index upper cladding e) is applied to prevent leaking of the light from the propagating mode into the attenuating (gold) electrodes. The refractive, indices of the low refractive index lower and upper cladding layers a) and e) are usually (approximately) the same.

Employing a low refractive index upper cladding layer e) with a larger thickness than that of the low refractive index lower cladding layer a) makes it possible to use a core-matching refractive index upper cladding layer d) which is thinner than the core-matching refractive index lower cladding b). In this case the resulting combined thickness of the low refractive index upper cladding d) and the core-matching refractive index upper cladding e) is smaller than the combined thickness of the low refractive index lower cladding a) and the core-matching refractive index lower cladding b). As a consequence, the structure is transversally asymmetric, with the core layer being close to the electrodes and thus experiencing stronger induced thermo-optical or electro-optical effects, resulting in a more efficient component.

The core-matching refractive index lower cladding b) and the core-matching refractive index upper cladding d) are applied to obtain transversal confinement of the propagating mode. The refractive index can be chosen in a relatively wide range to achieve the required properties, such as: monomode behavior, good overlap with a Standard Single Mode Fiber (SMF).

Lateral confinement can be achieved by all known methods for defining channels in planar waveguiding components. Suitable methods are:
1. shaping the core layer by etching techniques (for instance reactive ion etching with oxygen plasma) to obtain a buried channel waveguide,
2. bleaching the core layer to obtain a buried channel waveguide,
3. shaping either of the core-matching refractive index upper and lower cladding layers b) and d) to obtain a ridge (strip loaded) or an inverted ridge waveguide,
4. bleaching either of the core-matching refractive index upper and lower cladding layers b) and d) to obtain a ridge (strip loaded) or an inverted ridge waveguide.

All these techniques are known to the artisan and need no further elucidation here. When using technique 1, the core layer is etched away, leaving only the channel waveguide. Subsequently, core-matching refractive index upper cladding material is applied both on top of the core layer c) and onto the areas where the core material was etched away. This technique and also technique 2 are preferred because they can result in symmetrical channel waveguides. Symmetrical channel waveguides show low polarization dependence of the modal properties. When the bleaching technique is used, the refractive index of the core-matching refractive index cladding layers b) and d) should be adapted to the refractive index of the bleached parts of the core. When the shaping of the core technique is used, the refractive index of the core-matching refractive index upper cladding layer material is chosen such as to give the required properties, such as: monomode behavior, good overlap with a Standard Single Mode Fiber (SMF), low polarization dependence, low bend losses.

The polymers used for thermo-optical devices according to the invention are so-called optical polymers. Many optical polymers are known in the art, but there is still need for improvement. A particular problem of polymeric waveguides is the difference between the refractive indices of the core layer and the surrounding cladding layers. Typically, these index differences are in the range of 0.003 to 0.008. In waveguide switches switching is induced by index differences of 0.001 (digital switches) to 0.0001 (interferometer switches). These small index differences can be induced by thermo- or electro-optical properties of polymeric materials. In a thermo-optical switch the core index is lowered by locally heating the layer stack by means of a heating element. The closer the heater is to the core, the more efficiently this index lowering can be performed by a lower switching power. To prevent unwanted light absorption by the heater elements, it is advantageous to apply a low-index cladding layer between the waveguide and the heating element. The lower the index of the cladding layer is, the thinner this cladding layer can be, while leakage to the heater is still prevented. To prevent excess loss in the cladding layer and leakage to the substrate, this material must have a low absorption at the operating wavelengths (1.3 and 1.5 μm). Low refractive index polymers have been disclosed in WO96/28493, but their optical loss is relatively high. It is therefore an object of the invention to provide polymeric material with very low refractive index, and very low optical loss, preferably less than 0.15 dB/cm. However, the polymeric material must also display high Tg because of chemical and optical stability, and be cross-linkable to obtain cladding layers suitable for thermo-optical waveguides. Moreover, when polymeric material is used as a waveguide core, it is advantageous to use material with an index similar to that of the optical fiber attached to said waveguide, which effective index for standard single mode fiber is 1.467 at 1.3 μm and 1.468 at 1.5 μm. When doped silica is used as a core, the polymers of the invention can be used advantageously as cladding because their refractive indices can be lower than that of the glass core, which has the advantage that these hybrid waveguides can be rendered athermal.

It has now been found that a cross-linkable fluorinated polymer comprising the carbonate moiety having the formula:

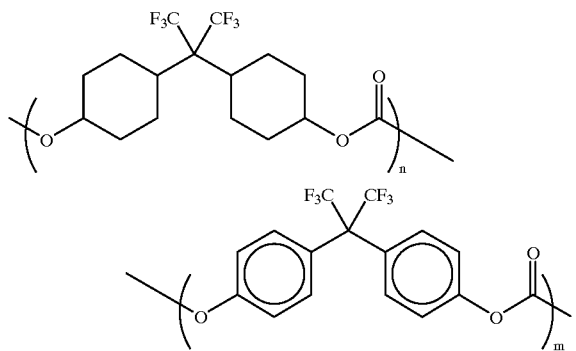

wherein n=1–10 and m=0–9 meets these demands. Preferably n=1–3 and m=0–3.

The various layers can be applied by spin-coating. In order to be able to spin-coat layer-on-layer, it is often necessary to cross-link one layer before applying the next. Therefore, the optical polymers or NLO polymers are rendered cross-linkable either by the incorporation of cross-linkable monomers or by mixing cross-linkers such as polyisocyanates, polyepoxides, etc. into the polymer.

Preferably, the polymer further comprises a cross-linkable moiety derived from a diol selected from:

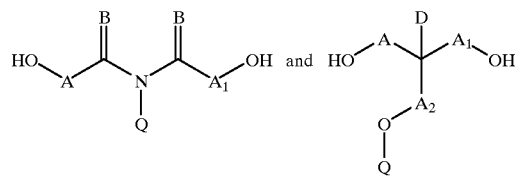

wherein
    $A$, $A_1$, and $A_2$ are independently a bond or $C_{1-12}$ alkylene, or together with the carbon atoms to which they are bonded form a 5- or 6-membered ring;
    $B$ is independently O or $C_{1-4}$ alkyl;
    $Q$ is —CO—C(=E)D, wherein
    $D$ is H or $C_{1-4}$ alkyl; and
    $E$ is $C_{1-6}$ alkylidene;
and each of the alkyl, alkylene, and alkylidene groups may be halogenated.

More preferably, the cross-linkable moiety is derived from the diol with the formula HO—$CH_2$—CH(OH)—$CH_2$—O—CO—C(=$CH_2$)$CH_3$.

The term $C_{1-4}$ alkyl means an alkyl group with 1 to 4 carbon atoms, such as methyl, ethyl, propyl, isopropyl, butyl, tert-butyl, and the like. Methyl is the preferred alkyl group.

The term $C_{1-12}$ alkylene means an alkylene group with 1 to 12 carbon atoms, such as methylene, ethylene, propylene, 2,2,-dimethylpropylene, dodecylene, and the like. A, $A_1$, and $A_2$ are preferably a bond or an alkylene group with 1–3 carbon atoms.

The term $C_{1-6}$ alkylidene means an alkylidene group with 1 to 6 carbon atoms, such as methylene, ethylidene, propylidene, 2-methylpropylidene, and the like. Methylene and ethylidene are the preferred alkylidene groups.

When the alkyl, alkylene, or alkylidene groups are halogenated, chlorine and fluorine are the preferred halogens. Fluorine is the most preferred halogen. The index of the polymer can be fine-tuned by selecting the number, the type, and the combination of halogens.

The polymer of the invention can be prepared by standard methods known in the art for the preparation of similar polymers. For instance, the bischloroformate of hexafluorobisphenol A or hexafluoroisopropylidene-dicyclohexanediol bischloroformate can be polymerized in suitable solvents with the hexafluoro-perhydro-bisphenol A, the synthesis of which has been disclosed in EP 0,279,462, optionally in the presence of suitable cross-linkable moieties, such as the above-mentioned diols.

Non-linear electric polarization may give rise to several optically non-linear phenomena, such as frequency doubling, Pockels effect, and Kerr effect. In order to render polymeric non-linear optical material active (obtain the desired NLO effect macroscopically), the groups present in the polymer, usually hyperpolarizable side-groups, first have to be aligned (poled). Such alignment is commonly effected by exposing the polymeric material to electric (DC) voltage, the so-called poling field, with such heating as will render the polymeric chains sufficiently mobile for orientation.

In order to enhance the stability of the thermo-optical component, oxygen scavengers and radical scavengers and the like may be added to the optical polymers.

The invention is further illustrated by the following examples.

EXAMPLE I

Hexafluoro-perhydro-bisphenol A (150.0 g), hexafluoro-bisphenol A bischloroformate (398.7 g), and 2,3- dihydroxypropyl methacrylate (68.9 g) were dissolved in a mixture of anhydrous dichloromethane (1.5 l) and anhydrous tetrahydrofuran (1 l). After cooling to 0° C., anhydrous pyridine (133.4 g) was added dropwise. After the addition, the reaction mixture was allowed to warm to room temperature and stirred overnight. The pyridine hydrochloride was filtered off and the filtrate was precipitated in 50 l of methanol. The precipitate was filtered off and washed with methanol. The polymer was dried overnight in vacuo at 5 kPa at 50° C. Yield 460 g. Mw 26,000; Mn 13,000; Tg 119–126° C.; TGA 190° C.

EXAMPLE II

The optical loss and the Tg of prior art polymers (A–C) with normal refractive indices were compared with the optical loss of the very low refractive index polymer of Example I:

| Compound | Refractive Index (1565 nm) | Optical Loss (dB/cm) | Tg (° C.) |
|---|---|---|---|
| A | 1.5170 | 0.1 | 168/193 |
| B | 1.5111 | 0.1 | 168/190 |
| C | 1.4837 | 0.12 | 163/183 |
| Example I | 1.4676 | 0.15 | 167/195 |

The optical loss and the Tg of prior art polymers (D–E) with very low refractive indices were compared with the optical loss of the very low refractive index polymer of Example I:

| Compound | Refractive Index (1565 nm) | Optical Loss (dB/cm) | Tg (° C.) |
|---|---|---|---|
| D | 1.4622 | N.D. | 88/97 |
| E | 1.4640 | 0.25 | 78/93 |
| Example I | 1.4676 | 0.15 | 167/195 |

N.D. = not determined

Key (monomer composition in mole %):

| | S | T | U | V | W |
|---|---|---|---|---|---|
| A | 50 | 25 (R = H) | — | — | 25 |
| B | 40 | 25 (R = H) | — | — | 25 |
| | | 10 (R = COCl) | | | |
| C | — | 25 (R = H) | — | — | 25 |
| | | 50 (R = COCl) | | | |
| D | — | 50 (R = COCl) | 25 | — | 25 |
| E | — | 50 (R = COCl) | — | 25 | 25 | legenda:

S =

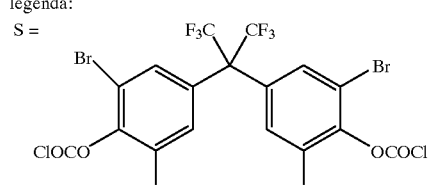

-continued

Key (monomer composition in mole %):

T =

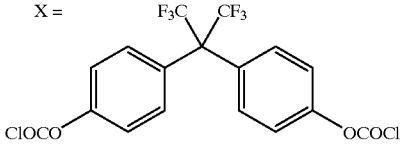

U =

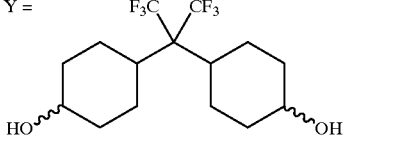

V = HO—CH$_2$—(CF$_2$)$_4$—CH$_2$—OH

W =

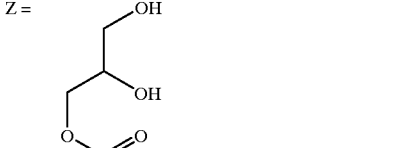

| | X | Y | Z |
|---|---|---|---|
| Example I | 50 | 25 | 25 | legenda:
X =

Y =

Z =

It may be concluded that the polymer of the invention has a Tg and an optical loss which are comparable with those of higher refractive index materials, whereas the Tg of the polymer of the invention is substantially higher than the Tg of other very low refractive index materials.

EXAMPLE III

A solution of 22.5 g of the polymer of Example I and 1.13 g of dicumyl peroxide in 77.5 g of cyclohexyl acetate was filtered through a 0.2 μm filter. The solution was spin-coated at 1000 rpm for 30 sec and then cured in a vacuum oven which was heated from 20° C. to 200° C. in 1.5 h and then kept at 200° C. for 30 min. The resulting product was cooled slowly to give a cladding layer having a refractive index of 1.4676 and an optical loss of 0.15 dB/cm which was used in a penta-layered thermo-optical device according to PCT application WO 97/01782.

EXAMPLE IV

A reactor was charged with 122 g of hexafluoroisopropylidenedicyclohexanol, 100 g of triphosgene (bis(trichloromethyl) carbonate), and 1 l of dry toluene, under a nitrogen atmosphere.

The temperature of the reactants was lowered to approx. −3° C. with stirring, after which 86.3 g of N,N-dimethylaniline diluted in 100 ml of dry toluene were added dropwise in 80 min.

The reaction mixture was diluted with 200 ml of dry toluene, the temperature was raised to ca. 70° C., and the mixture was stirred for approx. 50 h more under a stream of nitrogen to remove the excess phosgene and other volatile products.

After working up (extraction with 10% hydrochloric acid, water, and brine, drying on sodium sulfate, evaporation of toluene in vacuo, recrystallization from toluene/n-hexane 1/1.35 v/v, 0.28 g/ml, and drying) pure hexafluoro-isopropylidenedicyclohexanediol bischloroformate was obtained in approx. 33% overall yield.

To a stirred solution of 11.45 g of hexafluoroisopropylidenedicyclohexanediol bischloroformate, 4.17 g of hexafluoroisopropylidenedicyclohexanol, and 1.95 g of dihydroxy-isopropylmethacrylate dissolved in 70 ml of tetrahydrofuran/dichloromethane 2.4/1 v/v were added dropwise 3.83 g of pyridine in 10 ml of tetrahydrofuran/dichloromethane 2.4/1 v/v at 20° C. in approx. 60 min.

The reaction mixture was stirred overnight, the precipitate (pyridine.HCl salt) was removed by filtration. The polymer was precipitated by vigorous stirring in 1 l of methanol, collected, and stirred with fresh methanol. The product was collected by filtration and left to dry in a vacuum oven at 65° C. to yield 11.2 g (approx. 70%) of a polymer the recurring unit of which has the formula:

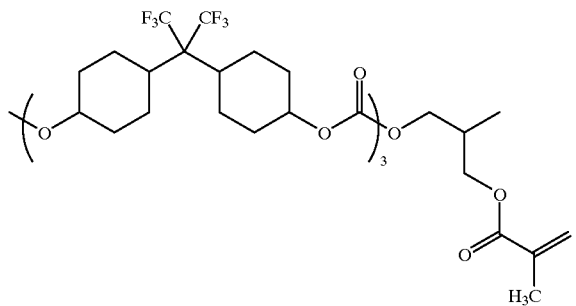

$M_w$=13,460; $M_n$=6,479; polydispersity 2.08.

Refractive index at 1550 nm 1.4428 and at 1300 nm 1.4443.

What is claimed is:

1. A cross-linkable fluorinated polymer comprising the carbonate moiety having the formula:

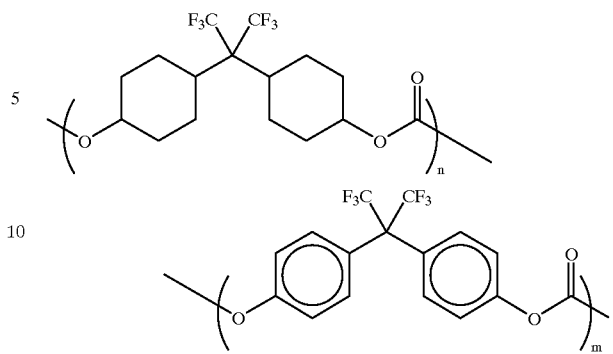

wherein n=1–10 and m=0–9.

2. The polymer of claim 1 wherein n=1–3 and m=0–3.

3. The polymer of claim 1 further comprising a cross-linkable moiety derived from a diol selected from:

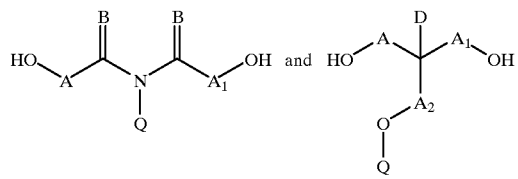

wherein A, $A_1$, and $A_2$ are independently a bond or $C_{1-12}$ alkylene, or together with the carbon atoms to which they are bonded form a 5- or 6- membered ring;

B is independently O or $C_{1-4}$ alkyl;

Q is —CO—C(=E)D, wherein

D is H or $C_{1-4}$ alkyl; and

E is $C_{1-6}$ alkylidene; and each of the alkyl, alkylene, and alkylidene groups are optimally halogenated.

4. The polymer of claim 2 further comprising a cross-linkable moiety derived from a diol selected from:

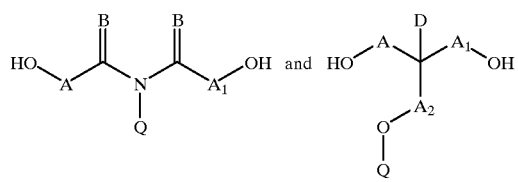

wherein A, $A_1$, and $A_2$ are independently a bond or $C_{1-12}$ alkylene, or together with the carbon atoms to which they are bonded from a 5- or 6- membered ring;

B is independently O or $C_{1-4}$ alkyl;

Q is —CO—C(=E)D, wherein

D is H or $C_{1-4}$ alkyl; and

E is $C_{1-6}$ alkylidene; and each of the alkyl, alkylene, and alkylidene groups may be halogenated.

5. The polymer of claim 3 wherein the cross-linkable moiety is derived from the diol with the formula HO—$CH_2$—CH(OH)—$CH_2$—O—CO—C(=$CH_2$)$CH_3$.

6. The polymer of claim 4 wherein the cross-linkable moiety is derived from the diol with the formula HO—$CH_2$—CH(OH)—$CH_2$—O—CO—C(=$CH_2$)$CH_3$.

7. A film comprising the polymer of claim 1.

8. A film comprising the polymer of claim 2.

9. A film comprising the polymer of claim 3.

10. A film comprising the polymer of claim 4.
11. A film comprising the polymer of claim 5.
12. A film comprising the polymer of claim 6.
13. A waveguide comprising the polymer of claim 1.
14. A waveguide comprising the polymer of claim 2.
15. A waveguide comprising the polymer of claim 5.
16. A waveguide comprising the polymer of claim 6.
17. A cladding layer comprising the polymer of claim 1.
18. A cladding layer comprising the polymer of claim 2.
19. A cladding layer comprising the polymer of claim 5.
20. A cladding layer comprising the polymer of claim 6.
21. A thermo-optical device comprising the polymer of claim 1.
22. A thermo-optical device comprising the polymer of claim 2.
23. A thermo-optical device comprising the polymer of claim 5.
24. A thermo-optical device comprising the polymer of claim 6.
25. The thermo-optical device of claim 21 having an at least penta-layered polymer structure on a substrate comprising:
   a) a low refractive index lower cladding layer,
   b) a core-matching refractive index lower cladding layer,
   c) a core layer,
   d) a core-matching refractive index upper cladding layer, and
   e) a low refractive index upper cladding layer, wherein the low refractive index upper cladding layer and, optionally, the low refractive index lower cladding layer comprises the cross-linkable fluorinated polymer comprising the carbonate moiety having the formula:

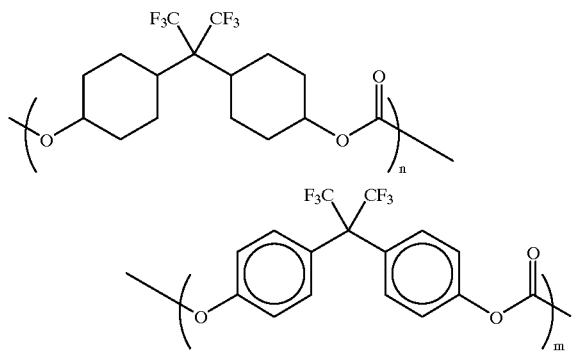

wherein n=1–10 and m=0–9.

26. The thermo-optical device of claim 22 having an at least penta-layered polymer structure on a substrate comprising:
   a) a low refractive index lower cladding layer,
   b) a core-matching refractive index lower cladding layer,
   c) a core layer,
   d) a core-matching refractive index upper cladding layer, and
   e) a low refractive index upper cladding layer, wherein the low refractive index upper cladding layer and, optionally, the low refractive index lower cladding layer comprises the cross-linkable fluorinated polymer comprising the carbonate moiety having the formula:

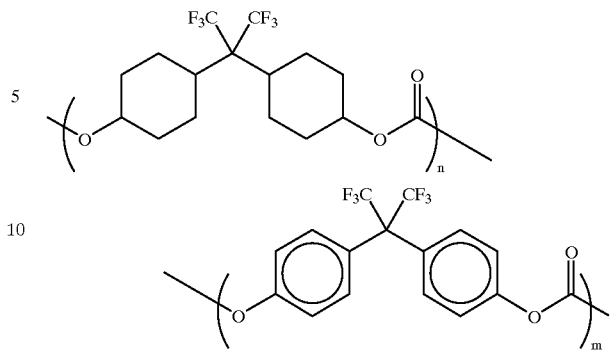

wherein n=1–3 and m=0–3.

27. The thermo-optical device of claim 23 having an at least penta-layered polymer structure on a substrate comprising:
   a) a low refractive index lower cladding layer,
   b) a core-matching refractive index lower cladding layer,
   c) a core layer,
   d) a core-matching refractive index upper cladding layer, and
   e) a low refractive index upper cladding layer, wherein the low refractive index upper cladding layer and, optionally, the low refractive index lower cladding layer comprise the cross-linkable fluorinated polymer comprising the carbonate moiety having the formula:

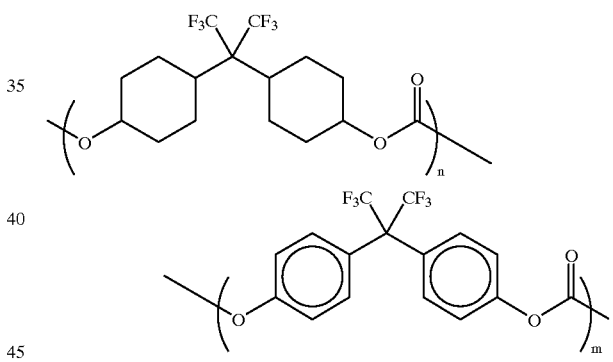

wherein n=1–3 and m=0–3;
the cross-linkable fluorinated polymer further comprising a cross-linkable moiety derived from a diol selected from:

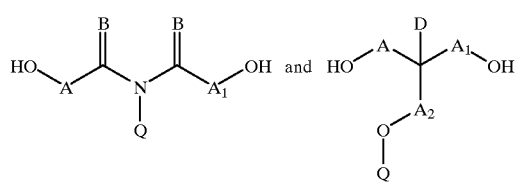

wherein A, $A_1$, and $A_2$ are independently a bond or $C_{1-12}$ alkylene, or together with the carbon atoms to which they are bonded from a 5- or 6- membered ring;
B is independently O or $C_{1-4}$ alkyl;
Q is —CO—C(=E)D, wherein
D is H or $C_{1-4}$ alkyl; and
E is $C_{1-6}$ alkylidene; and each of the alkyl, alkylene, and alkylidene groups may be halogenated.

28. The thermo-optical device of claim 24 having an at least penta-layered polymer structure on a substrate comprising:

a) a low refractive index lower cladding layer,
b) a core-matching refractive index lower cladding layer,
c) a core layer,
d) a core-matching refractive index upper cladding layer, and
e) a low refractive index upper cladding layer, wherein the low refractive index upper cladding layer and, optionally, the low refractive index lower cladding layer comprise the cross-linkable fluorinated polymer comprising the carbonate moiety having the formula:

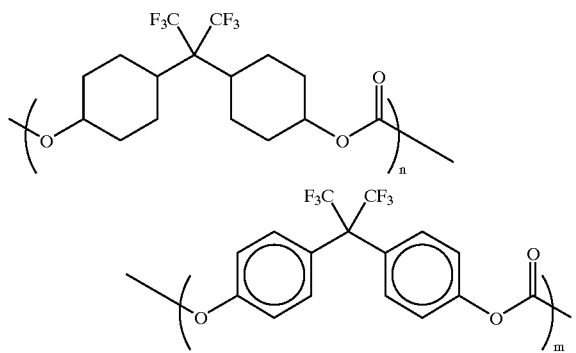

wherein $n=1-3$ and $m=0-3$;

the cross-linkable fluorinated polymer further comprising a cross-linkable moiety derived from a diol selected from:

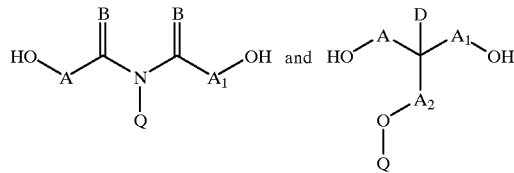

wherein A, $A_1$, and $A_2$ are independently a bond or $C_{1-12}$ alkylene, or together with the carbon atoms to which they are bonded from a 5- or 6- membered ring;

B is independently O or $C_{1-4}$ alkyl;

Q is —CO—C(=E)D, wherein

D is H or $C_{1-4}$ alkyl; and

E is $C_{1-6}$ alkylidene; and each of the alkyl, alkylene, and alkylidene groups may be halogenated;

and wherein the cross-linkable moiety is derived from the diol with the formula HO—$CH_2$—CH(OH)—$CH_2$—O—CO—C(=$CH_2$)$CH_3$.

* * * * *

UNITED STATES PATENT AND TRADEMARK OFFICE
CERTIFICATE OF CORRECTION

PATENT NO.   : 6,376,639 B1
DATED        : April 23, 2002
INVENTOR(S)  : Woudenberg et al.

It is certified that error appears in the above-identified patent and that said Letters Patent is hereby corrected as shown below:

Column 8,
Line 38, "alkylidene groups are optimally halogenated" should read -- alkylidene groups are optionally halogenated --

Signed and Sealed this

Sixteenth Day of July, 2002

*Attest:*

*Attesting Officer*

JAMES E. ROGAN
*Director of the United States Patent and Trademark Office*